United States Patent [19]

Dodgen

[11] Patent Number: 5,097,817
[45] Date of Patent: Mar. 24, 1992

[54] BARBECUE GRILL

[75] Inventor: John N. Dodgen, Humboldt, Iowa

[73] Assignee: Dodgen Industries, Inc., Humboldt, Iowa

[21] Appl. No.: 673,365

[22] Filed: Mar. 22, 1991

Related U.S. Application Data

[63] Continuation-in-part of Ser. No. 468,164, Jan. 22, 1990, Pat. No. 4,996,969.

[30] Foreign Application Priority Data

Aug. 3, 1990 [CA] Canada ................................ 2022660

[51] Int. Cl.⁵ .................................................... F24B 3/00
[52] U.S. Cl. .................................................... 126/25 R
[58] Field of Search ............. 126/25 R, 25 A, 25 AA, 126/9 R

[56] References Cited

U.S. PATENT DOCUMENTS

| | | | |
|---|---|---|---|
| 2,122,275 | 6/1938 | Bitney | 126/25 R |
| 2,541,528 | 2/1951 | McAvoy | 126/25 A |
| 2,690,171 | 9/1954 | Riedy | 126/25 R |
| 3,025,784 | 3/1962 | Williams | 126/25 A |
| 3,809,051 | 5/1974 | Giroux | 126/25 R |
| 4,530,343 | 7/1985 | Beck | 126/25 R |
| 4,592,334 | 6/1986 | Logan | 126/9 R |
| 4,850,333 | 7/1989 | Dellrud et al. | 126/25 A |
| 4,862,792 | 9/1989 | Lerma | 126/9 R |

Primary Examiner—Carroll B. Dority
Attorney, Agent, or Firm—Zarley, McKee, Thomte, Voorhees & Sease

[57] ABSTRACT

A barbecue grill having a housing equipped with one or more sold fuel drawers to provide heat for cooking to the housing. An elongated support with meat supporting hooks thereon is located in the top of the housing over a meat support grill. The meat support grill has side edges with sold fuel compartments therealong which are laterally spaced below the meat support means so that when combustible fuel is provided in the sold fuel compartment, juices from meat suspended from the meat support hooks will not drop into the solid fuel compartments.

5 Claims, 2 Drawing Sheets

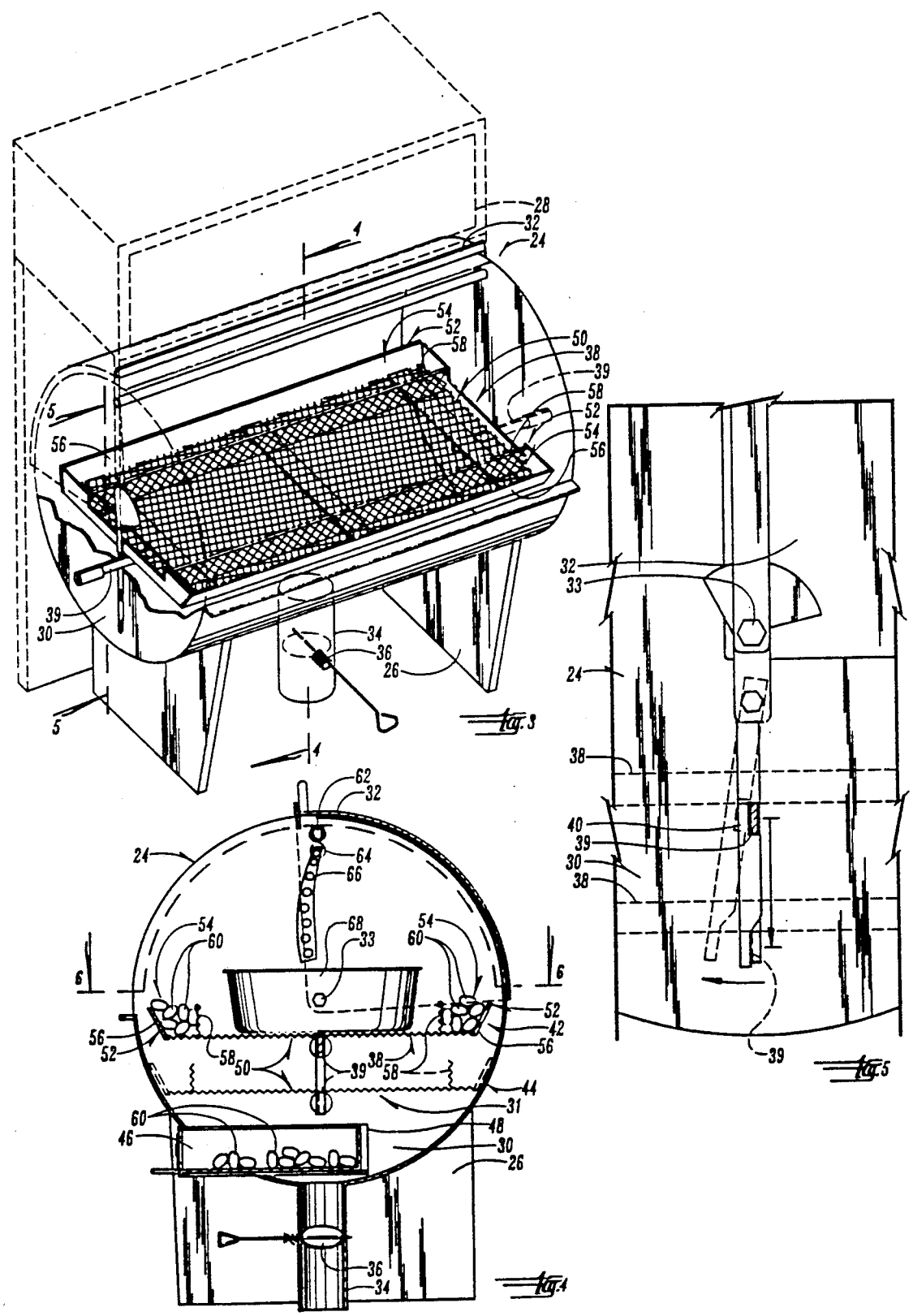

BARBECUE GRILL

This application is a continuation-in-part of application Ser. No. 468,164, filed Jan. 22, 1990, and now U.S. Pat. No. 4,996,969.

BACKGROUND OF THE INVENTION

Existing barbecue grills are not susceptible to ease in smoking and cooking ribs. One of the shortcomings of existing grills is that the burning of the grease and drippings from the ribs creates a different flavor, and existing grills do not provide structure to prevent the drippings from the ribs from coming in contact with the source of cooking heat.

It is therefore a principal object of this invention to provide a barbecue grill that is particularly adaptable for smoking and cooking ribs.

A further object of this invention is to provide a barbecue grill wherein thee ribs can be smoked and cooked without the drippings therefrom coming in direct contact with the source of cooking heat.

These and other objects will be apparent to those skilled in the art.

SUMMARY OF THE INVENTION

This invention provides a barbecue grill which has a housing equipped with one or more solid fuel drawers to provide heat for cooking to the housing. An elongated support means with meat supporting hooks thereon is located in the top of the housing over a meat support grill. The meat support grill has side edges with solid fuel compartments therealong which are laterally spaced below the meat support means so that when combustible fuel is provided in the solid fuel compartments, juices from meat suspended from the meat support hooks will not drop into the solid fuel compartments.

BRIEF DESCRIPTION OF THE DRAWINGS

FIG. 3 is an enlarged scale perspective view of the barbecue grill of this invention.

FIG. 4 is a sectional view taken along line 4—4 of FIG. 3.

FIG. 5 is an enlarged scale elevational view taken along line 5—5 of FIG. 3.

DESCRIPTION OF THE PREFERRED EMBODIMENT

Figure 1:
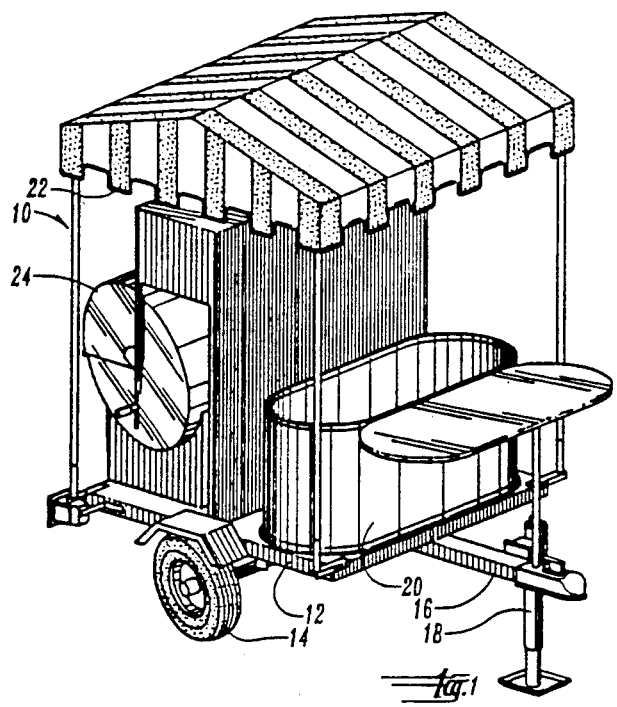
FIG. 1 is a perspective view of the barbecue grill of this invention.
Figure 2:
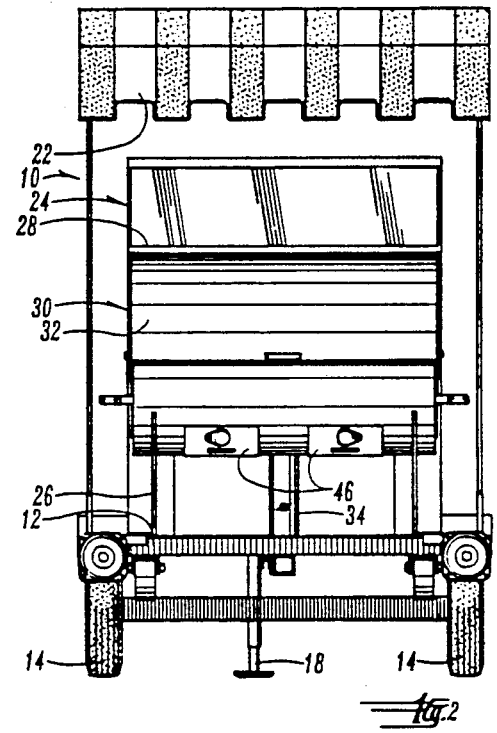
FIG. 2 is a rearward end view of FIG. 1.
Figure 6:
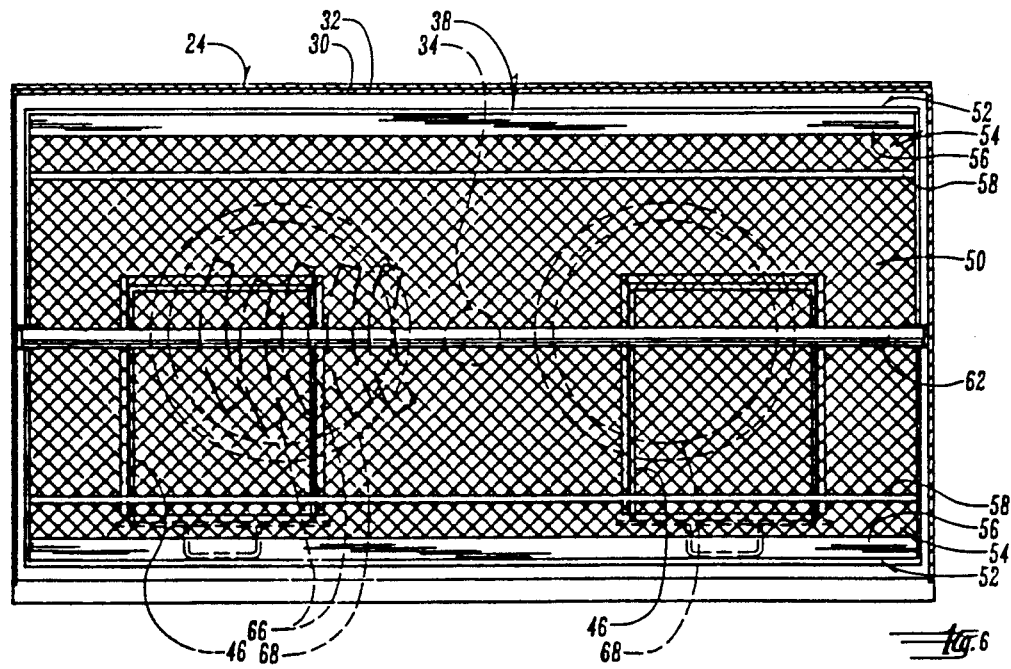
FIG. 6 is a horizontal sectional view taken along line 6—6 of FIG. 4.

The numeral 10 designates a wheel mounted barbecue trailer having a frame 12, wheels 14, tongue 16, tongue support jack 18, beverage container 20, and canopy 22.

A barbecue grill 24, very similar to the grill described in my co-pending application Ser. No. 468,164, filed Jan. 22, 1990, and now U.S. Pat. No. 4,996,969, is mounted on frame 12 and has its own frame 26 (FIG. 3). A warming oven 28 is provided above the lower grill housing 30 which contains combustion chamber 31. Lid 32 is hinged to combustion chamber 31 by hinge 33. An air supply tube 34 extends downwardly from lower grill housing 30 and contains flue control 36. A meat support grill 38 is mounted within the lower grill housing 30 on arms 39 which extend through suitable slots in ends of the housing 30. The structure is essentially shown in my aforesaid co-pending application. Lever assembly 40 permits the meat support grill to be moved from an upper position 42 to a lower position 44 (FIG. 4).

Solid fuel drawers 46 with open tops are slidably mounted in the forward portion of the lower grill housing 30. Each of the drawers 46 are mounted in a drawer receptacle 48 of compatible shape.

Meat support grill 38 has a central portion 50 with side areas 52. Solid fuel compartments 54 are formed on the side edge areas 52 of meat support grill 38 by means of an outer solid wall 56 and an inner open mesh wall 58. The numeral 60 designates solid fuel components, such as charcoal nuggets, which can be used in both the drawers 46 and in the solid fuel compartments 54.

An elongated rod 62 (FIG. 4) is mounted in any convenient means at the top of lower grill housing 30. A plurality of meat support hooks 64 are slidably mounted on rod 62 and are adapted to support ribs 66 or the like in an elevated position within the housing 30. The numeral 68 designates cooking pans for beans or the like which can be mounted on grill 38 during the cooking operation.

The normal use of the barbecue grill of this invention entails the placing of the ribs 66 on the hooks 64 as described. A plurality of charcoal components 60 are placed in the drawers 46 along with chips of hickory wood or the like. The charcoal is ignited to provide smoke and some heat for the barbecue grill with the lid 32 being in a closed condition. After the ribs 66 have been smoked and partially cooked for a period of 1½ hours or so, the combustible fuel in the drawers 46 is removed by sliding the drawers outwardly and placing the ignited charcoal, along with additional charcoal in the solid fuel compartments 54. This begins the intense cooking operation for the ribs. The drippings from the ribs will pass through the central area 50 of grill 38 and will not fall directly on the fuel components 60 in the compartments 54 because the compartments 54 are laterally spaced with respect to the downward path of the drippings. As a result, the drippings will not become incinerated to create special products of combustion that will adversely affect the flavor of the ribs. If desired, pans 68 with baked beans or the like can be placed underneath the ribs so that the falling juices from the ribs can be used to flavor the beans.

It is therefore seen that the structure and method of this device will accomplish at least all of the stated objectives.

What is claimed is:

1. A barbecue grill, comprising:
a generally planar grill means having a central area and an edge area;
said planar grill means having a partially open grillwork suitable for supporting meat products for cooking in a barbecue grill apparatus;
solid fuel compartments on said grill means along at least a portion of said edge area to confine solid fuel components to said edge area;
said grill means being mounted in the combustion compartment of a barbecue grill apparatus.
said barbecue grill apparatus having an elongated support means extending over said central area with meat support elements thereon so that drippings from meat supported thereby will fall to said central area away from said fuel compartments.

2. The device of claim 1 wherein said solid fuel compartments are comprised of a pair of spaced upstanding walls extending along at least a portion of said edge area.

3. The device of claim 2 wherein said upstanding walls are comprised of a solid outer wall and an inner wall having a partially open gridwork.

4. A barbecue grill, comprising:
a housing;
a meat support grill in said housing;
a solid fuel drawer slidably mounted in said housing below said meat support grill for containing a quantity of solid fuel components;
said meat support grill having side edges with elongated solid fuel compartments extending along at least a portion of said side edges;
said solid fuel compartments being comprised of a pair of spaced upstanding walls extending along at least a portion of said edge area;
said upstanding walls being comprised of a solid outer wall and an inner wall having a partially open gridwork.

5. A method of use of a barbecue grill comprising:
a housing;
a meat support grill in said housing;
a solid fuel drawer slidably mounted in said housing below said meat support grill for containing a quantity of solid fuel components;
said barbecue grill having elongated support means extending over and above said meat support grill with meat support elements thereon;
said meat support grill having side edges with elongated solid fuel compartments extending along at least a portion of said side edges;
wherein meat products are mounted on said support elements;
the method of use comprising:
combusting solid fuel components in said fuel drawer for initial smoking of said meat products;
removing said solid fuel components from said fuel drawer;
placing second solid fuel components in said solid fuel compartments which extend along at least a portion of said side edges and combusting the same.

* * * * *